J. ZIKMUND.
CASTER.
APPLICATION FILED OCT. 18, 1912.

1,058,837.

Patented Apr. 15, 1913.

2 SHEETS—SHEET 1.

WITNESSES

INVENTOR
J. Zikmund.
By
Attorneys.

J. ZIKMUND.
CASTER.
APPLICATION FILED OCT. 18, 1912.

1,058,837.

Patented Apr. 15, 1913.
2 SHEETS—SHEET 2.

WITNESSES

INVENTOR
J. Zikmund

Attorneys

UNITED STATES PATENT OFFICE.

JERRY ZIKMUND, OF POUGHKEEPSIE, NEW YORK.

CASTER.

1,058,837.  Specification of Letters Patent.  Patented Apr. 15, 1913.

Application filed October 18, 1912. Serial No. 726,560.

*To all whom it may concern:*

Be it known that I, JERRY ZIKMUND, citizen of the United States, residing at Poughkeepsie, in the county of Dutchess and State of New York, have invented certain new and useful Improvements in Casters, of which the following is a specification.

This invention relates to furniture casters and more particularly to that class of such devices as are arranged to be rendered inoperative when the table or other article to which they are applied is to remain stationary they being moved to operative position prior to moving the article of furniture from place to place. Ordinarily casters of this type are actuated by links and levers and other mechanical elements which extend beside or within the legs of the table, or the like, and which cannot be conveniently operated when it is desired to extend or retract the casters. Not only does such an operating means render the structure costly to manufacture, but inasmuch as such devices are generally used on very heavy tables and the casters are projected or retracted simultaneously, considerable exertion is required to adjust the casters.

The present invention therefore has as its object to provide a caster of this class which may be conveniently adjusted to support the article of furniture to which it is applied and equally as conveniently rendered inoperative, and incidentally the invention contemplates the adjustment of the caster automatically upon release by a latch by which it is normally held in one position or the other.

For a full understanding of the invention reference is to be had to the following description and accompanying drawing, in which:—

Figure 1:
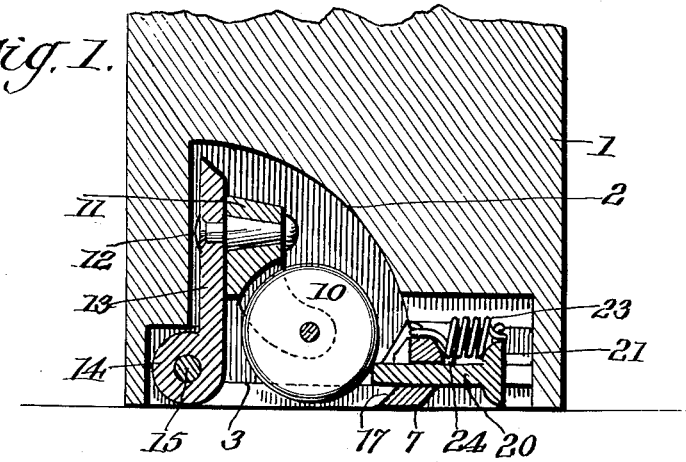
Figure 2:
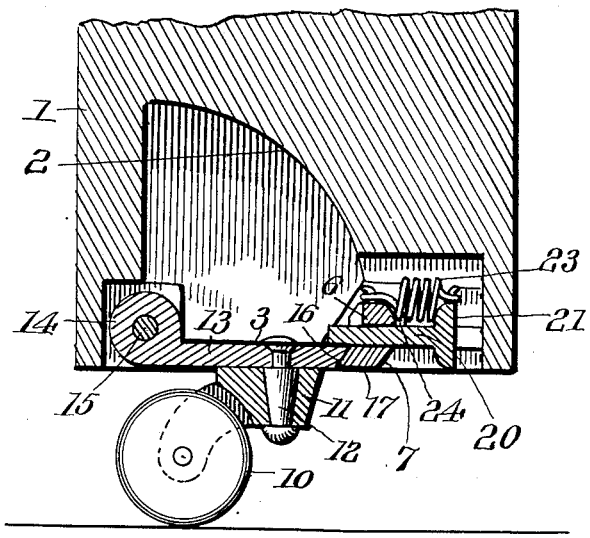
Figure 5:
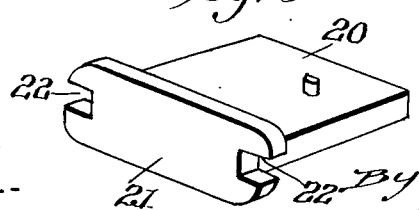
Figure 3:
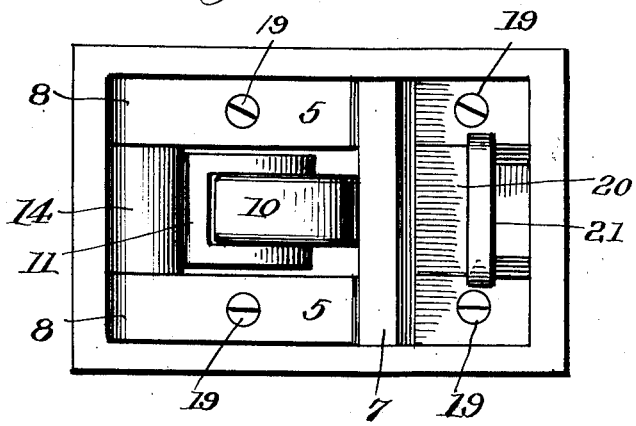
Figure 4:
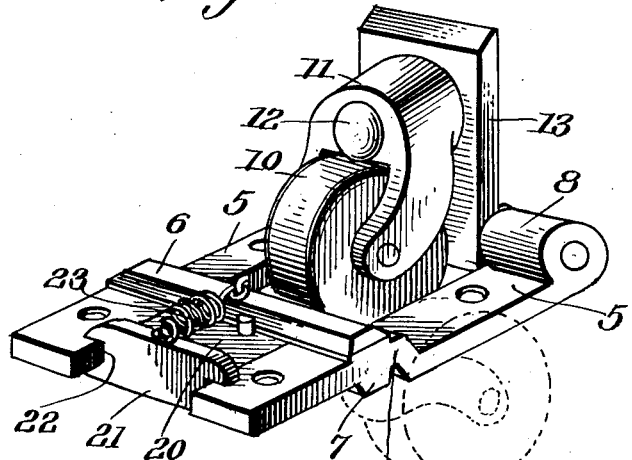
Figure 6:
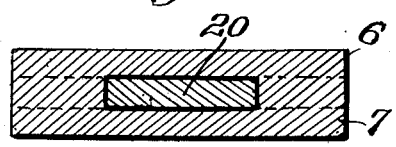

Figure 1 is a vertical sectional view through the caster embodying the present invention, the caster proper being out of position to support the leg by which it is carried. Fig. 2 is a similar view illustrating the caster proper in position to support the said leg. Fig. 3 is a bottom plan view of the caster with the parts in the position shown in Fig. 1. Fig. 4 is a perspective view of the caster detached from the leg. Fig. 5 is a perspective view of the latch-member provided for holding the caster proper in its two positions of adjustment. Fig. 6 is a vertical transverse sectional view on the line 6—6 of Fig. 4.

Corresponding and like parts are referred to in the following description and indicated in all the views of the drawings by the same reference characters.

In the drawings the caster is illustrated as mounted upon the leg 1 of a table or other article of furniture. The leg 1 is formed in its lower end with a recess 2 and with shoulders 3 and 4 which are located one at each side of the recess and slightly above the plane of the lower end of the said leg.

The caster embodying the present invention includes in its structure a base consisting of side-members 5 which extend in spaced parallel relation and are connected between their ends by integral cross-pieces 6 and 7, the cross-piece 6 being located upon the upper sides of the said side-members 5 and the cross-piece 7 being located upon the under sides thereof. One end of each of the side members 5 is provided with an integral pintle lug 8 and the said side members are preferably offset adjacent their opposite ends as indicated at 9 so that their under sides and the under face of the cross-member 7 will lie in the same horizontal plane.

The caster proper includes a caster-wheel 10 and a head 11 in which this wheel is mounted to turn the said head being swiveled as at 12 to a leaf 13 which constitutes the supporting member or base for the said caster. The leaf 13 is formed at one end with a pintle lug 14 which is disposed between the pintle lugs 8 and through which is inserted a pintle pin 15, the leaf 13 being in this manner hingedly supported between the side-members of the base. By referring to Figs. 1 and 2 of the drawings it will be observed that the free end-edge of the leaf 13 is beveled as at 16 and that the adjacent edge of the cross-member 7 is correspondingly beveled as indicated at 17 so that when the leaf 13 is in the position shown in Fig. 2 of the drawings, further downward swinging movement of the leaf will be prevented.

The side-members 5 are formed with openings 18 through which are passed screws 19 fitting into the shoulders 3 and 4 in the lower end of the leg 1, the caster being in this manner attached to the leg.

It will now be seen by referring to Figs. 1 and 2 of the drawings that the caster may assume the position shown in Fig. 1 in which position it is housed within the recess 2 and the lower end of the leg 1 is adapted to rest directly upon the floor surface, or at least assume the position shown in Fig. 2, in which latter position it supports the leg. In order to hold the caster in the last mentioned position, there is provided a latch-member consisting of a latch-plate 20 which is slidably fitted between the cross-members 6 and 7, and this latch-plate is provided at one end with a transversely extending head 21 having notches 22 between which are received the edges of the side-members 5. A spring 23 is connected at one end to the upper edge of the head 21 and at its other end to the cross-member 6.

A stop-pin 24 is provided upon the upper side of the latch-plate 20 and by abutting against the edge of the member 6, serves to limit the sliding movement of the latch-plate in the direction in which it is moved by the spring. The spring normally holds the latch-plate with its end opposite its headed end, in position for engagement against the periphery of the caster wheel 10, as shown in Fig. 1 or in engagement over the free edge portion of the leaf 13, as shown in Fig. 2. In the former instance the latch-plate serves to hold the caster in inoperative position to perform its supporting function, and in the latter instance it holds it in supporting position.

Assuming that the parts are in the position shown in Fig. 1 and it is desired to adjust the caster to support the table leg 1, the leg is slightly elevated and the latch-plate is slid back by engaging one's finger with the head 21. This will allow the caster proper to fall by gravity to the position shown in Fig. 2, whereupon the latch-plate is released and the parts will remain in position shown in the said figure. In order to return the caster to the position shown in Fig. 1, it is only necessary to draw back the latch-plate and allow the table leg to lower onto the floor surface.

Having thus described the invention what is claimed as new is:—

1. In a device of the class described, a hollow body, a base-member, a leaf hinged at one end to the said body, the body including spaced portions between which the leaf is arranged to seat, a caster supported by the leaf-member, spaced members connecting the first mentioned member of the base, and a latch-plate slidably fitted between the last mentioned members and arranged to engage against the upper side of the leaf in the free end thereof when the caster is in supporting position.

2. In a device of the class described, a recessed body, a base carried thereby and including spaced members and spaced connecting members, a leaf hinged between the first mentioned members, a caster supported by the said leaf and arranged to swivel thereon one of the connecting members having a beveled side and the leaf at its free end being beveled and arranged to fit against the beveled side of the said connecting member, a latch-plate slidably fitted between the said connecting members and arranged to engage over the upper face of the leaf when the leaf is in position with its beveled end edge engaging the beveled side of the said connecting member, and means yieldably holding the latch-plate for engagement with the said leaf.

In testimony whereof I affix my signature in presence of two witnesses.

JERRY ZIKMUND. [L. S.]

Witnesses:
J. ERNEST THORNHILL,
HARRY ARNOLD.